2,796,342

PROCESS FOR RECOVERING COPPER BY CHEMICAL PRECIPITATION

Felix A. Schaufelberger, Rye, and Patrick J. McGauley, Port Washington, N. Y., assignors to Chemical Construction Corporation, New York, N. Y., a corporation of Delaware No Drawing. Application January 28, 1954,
Serial No. 406,892

6 Claims. (Cl. 75—108)

This invention is concerned with the hydrometallurgical production of non-ferrous metals. More particularly, it deals with the selective separation of copper from solutions containing copper and other non-ferrous metals obtained by leaching ores, mineral concentrates and other copper-bearing solids which contain mixtures of copper and other non-ferrous metals. More specifically, it is concerned with the selective separation of copper from leach liquors obtained from such ores containing minerals of copper, nickel and cobalt.

Over the past 50 years, with the increasing utilization of such non-ferrous metals as copper, zinc, nickel, cobalt, cadmium and the like, particularly copper, there has steadily grown a demand for improved procedures whereby such metals can be more efficiently recovered from their ores. Particularly throughout the latter part of this period, many attempts have been made to devise processes for carrying out such operations by purely chemical operations.

Thus there is present in the industry a demand for a hydrometallurgical process which is adapted or adaptable to permit complete separation and recovery, not only of the copper but also the other useful non-ferrous metal values content of a suitable ore. Such a process should be capable of copper metal production in high purity and in economically feasible recovery. It should be adapted or adaptable, not only to the hydrometallurgical production of copper, but of additional non-ferrous metals, particularly nickel and cobalt. The separation of these latter two metals from solutions of salts of both, after removal of copper, iron and diluent metals, and the separation of each from the other is disclosed in the copending application noted above.

It is the principal object of the present invention to supply a process that with respect to copper meets the needs stated above. Surprisingly, this object has been achieved in a simple and straightforward manner.

As its starting material, the present process utilizes a solution containing a dissolved copper salt. Usually the solution results from the leaching of ores and therefore contains along with the copper at least one other non-ferrous metal, usually nickel and/or cobalt. The actual process steps may be simply outlined. The feed solution is adjusted to contain the proper hydrogen ion concentration. Thereafter, so-adjusted solution is treated at an elevated temperature, usually above about 275° F., with a non-sulfidizing reducing gas. A finite pressure of the reducing gas is maintained on the heated solution, the total pressure being maintained sufficient to prevent boiling. As a result copper is reduced and precipitated as copper metal powder and may then be collected as the product.

For many years it was thought that copper could be selectively precipitated from cobalt and nickel merely by controlling the stringency of the reduction conditions. It was subsequently found that copper could be reduced from such solutions, but not selectively. As shown for the first time in the above application, if reduction is initiated at acidic conditions, the reaction conditions are maintained acid, i. e., below pH 6.5 and preferably below about 3–4, an effective selective action in copper reduction away from cobalt and nickel can be obtained. In the instant case, which constitutes a continuation-in-part thereof, the conditions necessary for completely effective selection are more fully developed.

In the practice of this invention the source of the feed solution containing salts of copper and, if present, of nickel and cobalt is irrelevant. Usually, however, the solution will have been obtained by oxidation leaching of ores containing sulfide sulfur and similar ore concentrates or their calcines. Initially the solution may be basic or acidic. If acidic leaching is used, this solution will be a sulfate solution, usually containing at least 3% free sulfuric acid. It may be a basic solution from an ammoniacal leaching of either sulfide or oxide ores. The anion is usually sulfate or carbonate. However, other solutions in which copper, nickel and cobalt having an appreciable solubility may be used. One precaution must be observed. The anion must not be one such as permanganate which is more easily reduced than copper. To simplify the following discussion, treatment of sulfate solutions will be considered as illustrative.

Acidic solutions of copper, nickel and cobalt sulfates at ambient conditions have a solubility for the three metals ranging from about 90 grams per liter for solutions high in copper to about 120 g./l. for solutions high in cobalt and/or nickel. Treatment of more concentrated solutions can be accomplished if the solution is kept hot to avoid precipitation of the sulfates. Because the solution has to be heated and treated under pressure, it is not likely to be economical to use the process of this invention in solutions initially containing less than about 3 g./l. copper and preferably not less than about 10 g./l. For more dilute solutions either a preliminary concentration or the use of some other process such as cementation is indicated.

Salts, for example, the sulfates of other elements such as iron, aluminum, manganese, zinc and the alkali or alkaline-earth metals may be present. However, if extraneous salts are present in large amounts the concentration of the more valuable metals which can be maintained in solution is decreased. Moreover, if present to excess, the metal powder product may be contaminated. Such conditions should be avoided.

Ammonium sulfate may also be present and is usually actually helpful in maintaining metal solubility providing the solution contains either sufficient free ammonia to maintain a basic pH or is kept hot. However, in neutral or slightly acid solution excessive ammonium sulfate should not be present to prevent precipitation of the relatively insoluble double salt which forms in neutral or slightly acid solutions between ammonium and copper, nickel or cobalt sulfates and which at temperatures up to about 25° C. are easily salted out by ammonium sulfate. High proportions of free acid, i. e., about 25%, appreciably reduce the solubility of the metals. Furthermore, the solution should contain less than about 20% free acid to avoid contamination of copper metal precipitated in the reduction step. Above about 20% there is a marked tendency to precipitate copper sulfide. The same can happen at lower percentages if the reduction is done too hot or too long.

When copper is reduced from aqueous solution, a stoichiometric amount of acid is produced. Accordingly, during reduction, the free acid in the initial solution, plus the acid formed as the equivalent to the copper precipitated should be less than about 20% until copper precipitation is completed to the desired extent. If necessary during the reduction, there may be added an acid neutralizing agent such as ammonia or some equivalent alkali to prevent the free acid concentration from prematurely becoming too high. As an upper limit then, for solutions containing less than about 20% free sulfuric acid, or its equivalent, pure copper powder, free of nickel and cobalt, may be readily precipitated from a solution of mixed metal salts.

However, the lower limit may vary considerably. Copper in satisfactory form can be precipitated from basic solutions. Moreover, it has been found that when the concentration of the free acid approaches the upper limit, the reaction rate slows down. Therefore, if the copper concentration is low, particularly if it becomes appreciably less than the concentration of nickel and cobalt, it is desirable to have the solution at as low an acid content as is practicable.

On the other hand, under such conditions, there are certain minimum terminal acid limits which must be observed. For example, for nickel-free copper to be reduced to less than one gram per liter of residual dissolved copper from a solution containing nickel to one g./l. or more, it has been found that the solution should contain a minimum of about 24 g./l. free sulfuric acid or its equivalent. Similarly, in order to remove a cobalt-free copper to the same extent from a solution containing cobalt but no nickel, it is necessary to have the solution contain a minimum of about 5 g./l. free sulfuric acid or its equivalent. Since these are necessary conditions, the initial solution or the solution during reduction must be adjusted to provide the necessary acid content when the metal contents reach such concentrations. Of course, if the initial solution is in the necessary condition, no further initial adjustment is necessary.

This does not mean that copper reduction must be started from a solution initially containing the 5 gm./l. free acid in the case of cobalt or the 24 gm./l. if nickel is present. Copper, cobalt and nickel all may be precipitated from a solution which is initially basic, i. e., contains "free" ammonia. However, if the copper is present in appreciable molar excess to cobalt or nickel, it will be reduced preferentially until its dissolved mol ratio to the total mols of other dissolved metals decreases to below about one half. As this condition is approached, the limitations described above become critical and must be maintained.

This may be utilized in several ways. For example, for solutions containing free ammonia, ammonium sulfate will be formed as copper is reduced. If the initial ammonia is present in a quantity less than two mols per mol of dissolved copper, the solution will become more acid. If the initial ammonia is greater than two mols per mol of dissolved copper, the solution will remain ammoniacal. So for solutions high in copper, it is quite simple to start reducing copper with such an ammoniacal solution and still finish the reduction with enough free sulfuric acid present to avoid reduction of nickel and/or cobalt with the copper as the critical copper:nickel and/or copper:cobalt ratios are approached.

Accordingly, when the dissolved metal content of copper is high, considerable allowance can and must be made to prevent exceeding the upper acid limit for copper. On the other hand, the minimums for the other metals must be maintained. It is possible therefore to start reduction from a solution containing enough free ammonia to arrive at the plus 24 gm./l. minus 17% free acid range as the critical ratios are approached. This is the simplest control. However, one may start at higher acid contents and add neutralizing agent as reduction proceeds if so desired.

In other words, if the initial solution is adjusted so that at the terminal conditions any free acid initially present plus the acid liberated during copper reduction, less the acid stoichiometric to the free ammonia present, is at least about 24 g./l. if nickel is present, or at least about 5 g./l. if nickel is absent and cobalt is present, but less than 20%, the copper can be substantially completely reduced from the solution as a powder substantially free of nickel and cobalt.

Where, in the present specification and claims, the terms "free acid" or "free ammonia" are used they are intended to define the above described conditions. Free acid means the unneutralized acid present in the solution. Free ammonia similarly means the unneutralized ammonia, i. e., the total of the ammonia present as such, as combined in with a metal in a complex ammine ion and that as ammonium hydroxide.

After any necessary adjustment of the initial solution, it should be clarified, as by filtration, to remove any solid impurities since their presence in the copper powder is undesirable.

The solution is then treated with a reducing gas at an elevated temperature, preferably in an agitated vessel to precipitate the copper. Expecially in precipitating copper, it is best to use a gas free of sulfur. Hydrogen is preferred. Carbon monoxide may also be used conveniently if the solution is always acid. In solutions containing free ammonia, carbon monoxide forms nickel carbonyl which is difficult to handle safely and results in a high consumption of reducing gas. Although even a small positive partial pressure of reducing gas, if maintained throughout, will result in substantially complete copper removal, it is desirable to avoid such careful control; and the preferred conditions involve a partial pressure of at least 50 p. s. i. of hydrogen.

The temperature may be as low as about 275° F., but the reaction rate is slow and as a lower limit, a temperature of from about 350°–425° F. is preferred. In general, a total pressure reading will be between about 600–900 p. s. i. Under these conditions, reduction can be accomplished in about 15 to 60 minutes. If copper powder produced in a previous operation is present for seeding purposes, the time required is appreciably reduced. If the reduction is done continuously, this powder will be normally present. If it is done batchwise, some powder may be added if none remains in the autoclave from the previous batch. As noted above, temperatures lower than 350° F. and partial pressures less than 100 p. s. i. of reducing gas can be used, but the reduction requires a much longer time. Higher temperatures and pressures also can be used, but these require heavier vessels which normally would not be justified by the decrease in treatment time.

Preferably the reducing gas is added below the liquid surface. One desirable method is to add it below the agitator so that its dispersion throughout the liquor is improved. When the total gas is added at the outset in batch reduction, it is desirable that the agitator inspirate gas from about the liquid. Agitation is very important for the additional reason that it should also be sufficient to keep as large a proportion as possible of the copper powder in suspension.

After copper reduction is complete, powder is separated from the solution. The specific methods of separation form no part of the present invention. The separation is usually accomplished by thickening, decantation or filtering. It is usually convenient to cool the solution by reducing the pressure to atmospheric. Depending on the equipment used, this can be done before or after separating the powder. The solution containing cobalt and/or nickel may then be treated for the recovery of those two metals.

The copper powder produced may be washed to remove any ammonium, nickel, or cobalt sulfates and any other impurities remaining from the mother liquor. It is preferable to do this washing in the absence of air. A wash with a 5% sulfuric acid solution helps prevent reoxidation of the copper. The washed powder may then be dried if so desired. For optimum purity, drying to at least 300° F. in a natural or reducing atmosphere is desirable.

The following example serves to illustrate the invention.

*Example*

A solution containing 7.8 g./l. copper, 9.7 g./l. cobalt, 12.3 g./l. nickel, and 1.08 g./l. iron is added to an autoclave. To the solution is added 38 g./l. $H_2SO_4$, and 16 g./l. copper seed metal assaying 99.7% copper. The autoclave is sealed and the air space is purged with hydrogen to a pressure of 50 p. s. i. g. The autoclave is then heated to 400° F. with agitation and hydrogen is added to maintain a total pressure of 600 p. s. i. g. When the precipitation is done, the precipitated copper is separated from the mother liquor, washed with a 5% solution of sulfuric acid, and dried under reducing conditions. Substantially 100% of the original copper content of the solution was obtained as copper metal powder in purity of 99.9% and showing no trace of either cobalt or nickel.

I claim:

1. In separately recovering copper by chemical precipitation from a clarified aqueous sulfate solution containing salts of copper and at least one other metal selected from nickel and cobalt, the improvement which comprises: adjusting the initial hydrogen ion concentration of the solution to a value less than that equivalent to about a 20% free sulfuric acid content, but at least that equivalent to a free sulfuric acid content of about 5 grams per liter in the presence of cobalt and at least about 24 grams per liter in the presence of nickel; treating the adjusted solution at a temperature of above about 275° F. with a non-sulfidizing reducing gas while maintaining a finite pressure of reducing gas and a total pressure sufficient to prevent boiling; and collecting precipitated copper metal powder.

2. A process according to claim 1, adapted for use when the initial mol ratio of dissolved copper to mols of dissolved cobalt plus nickel exceeds about 0.5, wherein said adjustment of the initial hydrogen ion concentration is accomplished by addition of ammonia and said copper reduction is initiated at a hydrogen ion concentration less than that equivalent to a free sulfuric acid content of about 5 grams per liter in the presence of cobalt and less than that equivalent to about 24 grams per liter in the presence of nickel, but said initially adjusted hydrogen ion concentration being sufficiently high that when increased it is (a) by the acid liberated by copper reduction and (b) diminished by the acid neutralized by ammonia to ammonium salt it will be at least equivalent to those at said free acid contents before said ratio decreases below about 0.5.

3. A process according to claim 1 wherein sufficient neutralizing agent is added during said copper reduction to maintain the free acid content below about 20%.

4. A process according to claim 1 in which the reduction to copper metal is initiated and completed in a solution having a free acid content above about 24 grams per liter and less than the equivalent of about 20% free sulfuric acid and sufficient acid neutralizing agent is provided during the reduction to maintain the acid content below about 20% until copper reduction is substantially complete.

5. A process according to claim 1 in which said adjusted solution is heated to a temperature in the range of about 350°–425° F.

6. A process according to claim 1 in which said total pressure is in the range 600–900 p. s. i.

References Cited in the file of this patent

UNITED STATES PATENTS

| | | |
|---|---|---|
| Re. 12,815 | Wilcox | June 16, 1908 |
| 60,514 | Henderson | Dec. 18, 1866 |
| 924,077 | Jamau | June 8, 1909 |
| 1,201,899 | Weidlein | Oct. 17, 1916 |
| 1,223,454 | Weidlein | Apr. 24, 1917 |
| 1,686,391 | Muller et al. | Oct. 2, 1928 |
| 2,647,828 | McGauley et al. | Aug. 4, 1953 |
| 2,647,830 | Allen et al. | Aug. 4, 1953 |
| 2,647,832 | Allen et al. | Aug. 4, 1953 |